(12) United States Patent
Baek, IV et al.

(10) Patent No.: US 9,151,311 B2
(45) Date of Patent: Oct. 6, 2015

(54) MULTI-CONNECTORS FOR EXTENDABLE CONVEYORS

(71) Applicants: Anders Stougaard Baek, IV, Aarhus C (DK); Allan Falk, Horsens (DK); Mads Oestergaard, Viby J (DK); Brian Bondegaard Nielsen, Horsens (DK)

(72) Inventors: Anders Stougaard Baek, IV, Aarhus C (DK); Allan Falk, Horsens (DK); Mads Oestergaard, Viby J (DK); Brian Bondegaard Nielsen, Horsens (DK)

(73) Assignee: CALJAN RITE-HITE APS, Hasselager (DK)

( * ) Notice: Subject to any disclaimer, the term of this patent is extended or adjusted under 35 U.S.C. 154(b) by 233 days.

(21) Appl. No.: 13/782,744

(22) Filed: Mar. 1, 2013

(65) Prior Publication Data
US 2013/0233676 A1   Sep. 12, 2013

(30) Foreign Application Priority Data
Mar. 1, 2012  (EP) .................................... 12001399

(51) Int. Cl.
*B65G 21/00* (2006.01)
*B65G 35/00* (2006.01)
(Continued)

(52) U.S. Cl.
CPC ................ *F16B 17/00* (2013.01); *B65G 21/00* (2013.01); *B65G 35/00* (2013.01); *F16L 25/00* (2013.01); *H01R 13/58* (2013.01); *B65G 2207/30* (2013.01); *Y10T 403/55* (2015.01)

(58) Field of Classification Search
CPC .... B65G 35/00; B65G 21/00; B65G 2207/30; F16B 17/00; F16L 25/00; H01R 13/58; Y10T 403/55

USPC ............................................... 198/812, 860.2
See application file for complete search history.

(56) References Cited

U.S. PATENT DOCUMENTS 2,721,645 A   10/1955   Eberle
3,837,510 A    9/1974   McWilliams
(Continued)

FOREIGN PATENT DOCUMENTS

DE          20202926        5/2002
DE        102010005267      7/2011
(Continued)

OTHER PUBLICATIONS

United States Patent and Trademark Office, "Notice of Allowance," issued in connection with U.S. Appl. No. 13/782,742, on Sep. 17, 2014 (17 pages).
(Continued)

*Primary Examiner* — Mark A Deuble
(74) *Attorney, Agent, or Firm* — Hanley, Flight & Zimmerman, LLC

(57) ABSTRACT

Multi-connectors for extendable conveyors are disclosed. An example multi-connector to connect an external component to an extendable conveyor is disclosed. The extendable conveyor is to convey articles and includes a base unit, a mechanically extendable section to be supported in a cantilevered manner and to be selectively positioned relative to the base unit, and a conveying surface to convey articles. The conveying surface is to extend at least partially on an upper side of the mechanically extendable section. The multi-connector includes a mechanical connection section to mechanically attach the external component, a fastening section to fasten the multi-connector to the extendable conveyor, and a functional/powered connection section to provide at least one of electric power or a vacuum supply to the external component.

20 Claims, 6 Drawing Sheets

(51) Int. Cl.
  *F16L 25/00* (2006.01)
  *F16B 17/00* (2006.01)
  *H01R 13/58* (2006.01)

(56) References Cited

U.S. PATENT DOCUMENTS

| | | | |
|---|---|---|---|
| 4,236,194 A | 11/1980 | Norman | |
| 4,281,955 A | 8/1981 | McWilliams | |
| 4,425,069 A * | 1/1984 | Saur et al. | 414/398 |
| 4,774,799 A | 10/1988 | Durant | |
| 5,051,874 A | 9/1991 | Guss | |
| D353,701 S | 12/1994 | Beavers et al. | |
| D367,143 S | 2/1996 | Sauber | |
| 5,582,286 A * | 12/1996 | Kalm et al. | 198/781.06 |
| 6,092,911 A | 7/2000 | Baker, III et al. | |
| 6,484,862 B1 | 11/2002 | Gilmore et al. | |
| 6,843,362 B2 | 1/2005 | Tachibana et al. | |
| D572,875 S | 7/2008 | Ito et al. | |
| D580,123 S | 11/2008 | Ito et al. | |
| 7,537,101 B2 * | 5/2009 | Aulanko et al. | 198/322 |
| 7,775,339 B2 | 8/2010 | Ogimura | |
| 7,870,949 B2 | 1/2011 | Kanaris | |
| 7,909,153 B2 | 3/2011 | Pogue | |
| 7,983,821 B2 | 7/2011 | Reeves | |
| 8,033,775 B2 | 10/2011 | Donelson et al. | |
| 8,662,291 B2 | 3/2014 | Henderson | |
| 9,004,264 B2 | 4/2015 | Baek, IV et al. | |
| 2003/0019714 A1 | 1/2003 | Shaw et al. | |
| 2005/0087428 A1 * | 4/2005 | Pelak et al. | 198/780 |
| 2006/0133913 A1 | 6/2006 | Helmner | |
| 2008/0060386 A1 | 3/2008 | Kanno et al. | |
| 2009/0277753 A1 * | 11/2009 | Violle | 198/586 |
| 2010/0133214 A1 | 6/2010 | Evans | |
| 2011/0005902 A1 * | 1/2011 | Kobs et al. | 198/780 |
| 2013/0228419 A1 | 9/2013 | Baek, IV et al. | |
| 2013/0299313 A1 | 11/2013 | Baek, IV et al. | |

FOREIGN PATENT DOCUMENTS

| | | |
|---|---|---|
| DE | 102010033115 | 2/2012 |
| EP | 1568628 | 8/2005 |
| EP | 2003076 | 12/2008 |
| WO | 0208098 | 1/2002 |
| WO | 2006068443 | 6/2006 |

OTHER PUBLICATIONS

United States Patent and Trademark Office, "Supplemental Notice of Allowance," issued in connection with U.S. Appl. No. 13/782,742, on Nov. 7, 2014 (8 pages).

United States Patent and Trademark Office, "Notice of Allowance," issued in connection with U.S. Appl. No. 13/782,740, on Dec. 10, 2014 (13 pages).

European Patent Office, "Extended European Search Report," issued in connection with European application serial No. 12001401.4, mailed Aug. 3, 2012, 7 pages.

European Patent Office, "Extended European Search Report," issued in connection with European application serial No. 12001400.6, mailed Jul. 26, 2012, 7 pages.

European Patent Office, "Extended European Search Report," issued in connection with European application serial No. 12001399.0, mailed Aug. 2, 2012, 7 pages.

State Intellectual Property Office of P.R.China, "Notice of Granting Patent Right for Design," issued in connection with Chinese application serial No. 201230419164.X, issued Feb. 1, 2013, 4 pages.

United States Patent and Trademark Office, "Office Action," issued in connection with U.S. Appl. No. 29/431,014, on Jul. 14, 2014 (6 pages).

United States Patent and Trademark Office, "Office Action," issued in connection with U.S. Appl. No. 13/782,740, on Jul. 9, 2014 (5 pages).

United States Patent and Trademark Office, "Non-Final Office Action," issued in connection with U.S. Appl. No. 13/782,742, mailed May 30, 2014, 25 pages.

European Patent Office, "Communication Pursuant to Article 94(3) EPC," issued in connection with European patent application No. 12 001 399.0-1707, dated Apr. 30, 2014, 5 pages.

European Patent Office, "Communication Pursuant to Article 94(3) EPC," issued in connection with European patent application No. 12 001 4014-1707, dated Apr. 30, 2014, 5 pages.

European Patent Office, "Decision to grant a European patent pursuant to Article 97(1) EPC," issued in connection with European Patent Application No. 12001400.6, dated Jan. 22, 2015, 1 page.

The United States Patent and Trademark Office, "Corrected Notice of Allowability," issued in connection with U.S. Appl. No. 13/782,742, dated Jan. 7, 2015, 11 pages.

The United States Patent and Trademark Office, "Notification of Reopening of Prosecution Due to Consideration of an Information Disclosure Statement Filed After Mailing of a Notice of Allowance," issued in connection with U.S. Appl. No. 13/782,742, dated Feb. 10, 2015, 10 pages.

The United States Patent and Trademark Office, "Non-Final Office Action," issued in connection with U.S. Appl. No. 13/782,742, dated Mar. 4, 2015, 10 pages.

The United States Patent and Trademark Office, "Notice of Allowance," issued in connection with U.S. Appl. No. 29/431,014, dated Apr. 10, 2015, 20 pages.

United States Patent and Trademark Office, "Notice of Allowance," issued in connection with U.S. Appl. No. 13/782,742, Jun. 16, 2015, 23 pages.

United States Patent and Trademark Office, "Corrected Notice of Allowability," issued in connection with U.S. Appl. No. 29/431,014, Jul. 31, 2015, 6 pages.

* cited by examiner

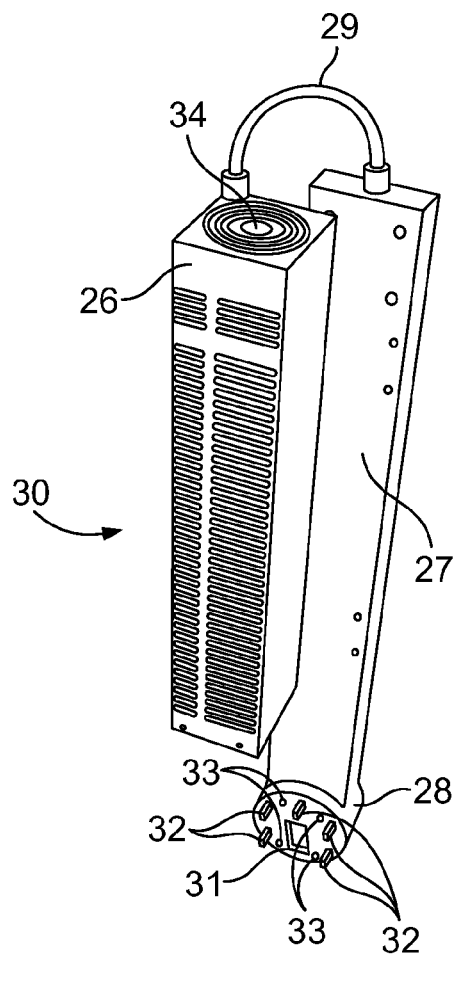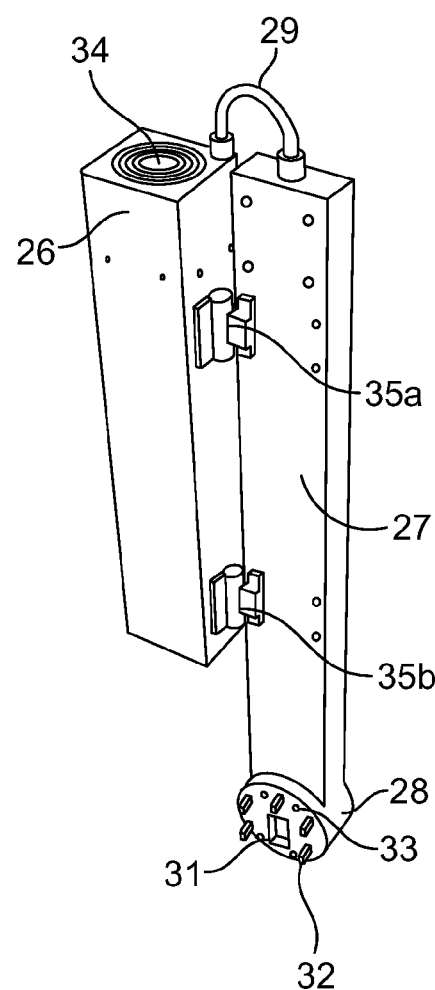
FIG. 8
FIG. 9

MULTI-CONNECTORS FOR EXTENDABLE CONVEYORS

FIELD OF THE DISCLOSURE

This disclosure relates generally to conveyors and, more particularly, to multi-connectors for extendable conveyors.

BACKGROUND

The loading and unloading of packages from truck trailers or the like can be a physically challenging task for which extendable conveyors are used.

Extendable conveyors, such as described in WO 2006/068443 A1 and DE 10 2010 005 267 A1, have a base unit and multiple extendable conveyor sections which are nested within each other. The total length of the extendable conveyor can be adjusted by extending or retracting the nested extendable conveyor sections. The end of the extendable conveyor (e.g., the outmost extendable conveyor section) can move, for example, into a truck at a loading dock for loading or unloading goods. Such known extendable conveyors have a front light at the front of the outmost extendable conveyor section to illuminate the front area of the outmost conveyor section.

It is anticipated that the volume of loose-loaded goods being transported will continue to increase. Additionally, it is anticipated that attracting people to work in the loading and/or unloading zone will become more difficult as fewer people in later generations enter the labor market. Moreover, loading and/or unloading zones are typically cramped and the environment in the zones is uncomfortable. Thus, there is a need to make the loading and/or unloading zone or working area comfortable and to thereby make it attractive for personnel. Furthermore, the loading and/or unloading zone is a hazardous area and there is a risk that personnel may get hurt.

BRIEF DESCRIPTION OF THE DRAWINGS

FIG. 8 illustrates the example fan of FIG. 7 in more detail and an example component connector for being connected to the example multi-connector of FIG. 1.

FIG. 9 illustrates the example fan of FIGS. 7 and 8 from a back view for showing an example hinge connection between the example fan and an example fan holder.

DETAILED DESCRIPTION

Figure 1:
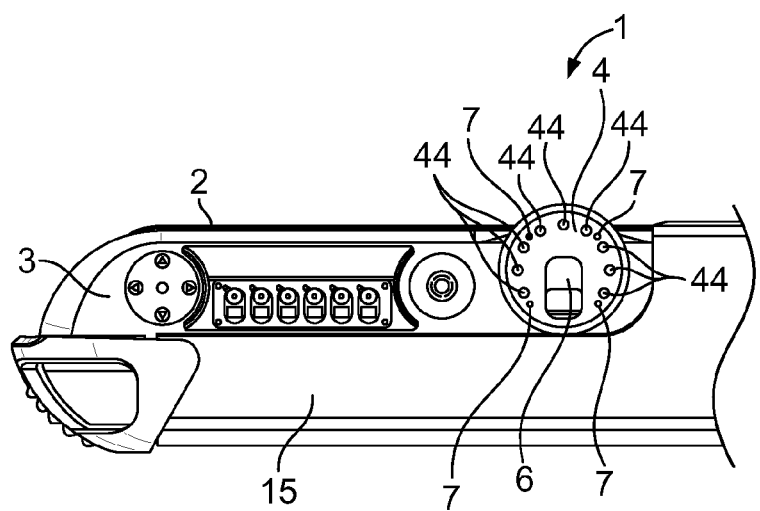
FIG. 1 illustrates an example multi-connector at an outmost mechanically extendable section of an extendable conveyor constructed in accordance with the teachings disclosed herein.

FIG. 1 illustrates an example multi-connector 4 of an extendable conveyor 1 constructed in accordance with the teachings disclosed herein.

As discussed in the outset, extendable conveyors, such as disclosed in WO 2006/068443 A1 and DE 10 2010 005 267 A1, which are hereby incorporated by reference in their entireties, have a base unit and multiple extendable conveyor sections which are nested within each other. The total length of the extendable conveyor can be adjusted by extending or retracting the nested extendable conveyor sections. The end of the extendable conveyor (e.g., the outmost extendable conveyor section) can move, for example, into a truck at a loading dock for loading or unloading goods.

As mentioned, due to the uncomfortable environment typically surrounding the working area of an extendable conveyor, it might be difficult in the future to attract people to work in the loading and/or unloading zone near the extendable conveyor. Moreover, loading and/or unloading zones are typically cramped and hazardous and, thus, pose a risk of injury to personnel.

The inventors have recognized that comfort for personnel working in the working area surrounding an extendable conveyor can be improved when, in particular, external components at a front end of an extendable conveyor, such as a light, fan, lifting system or the like, can be mounted to assist personnel in the loading and/or unloading zone doing their work. Such external components can be easily connected and disconnected to the extendable conveyor via a multi-connector constructed in accordance with the teachings disclosed herein.

With such a multi-connector, in some examples, there is no need to provide an extra mechanical, electrical and/or vacuum connection for an external component to the extendable conveyor.

In some examples, a multi-connector is configured for connecting at least one external component, such as a light, fan, lifting system or the like, to an extendable conveyor.

In some examples, the extendable conveyor is configured for conveying articles and comprises a base unit, at least one mechanically extendable section, which is adjustably positionable between a retracted position fully or partially nested within the base unit and an extended position fully or partially telescoped forwardly from the base unit, and a conveying surface for conveying articles.

In some examples, the base unit is configured to be moveable in the direction of the mechanically extendable sections and/or transversely to this direction.

The conveying surface, in some examples, extends at least partially on an upper side of the at least one mechanically extendable section. In some examples, the conveying surface also extends on the base unit. As known to the skilled person, the conveying surface can be formed by a belt or rollers.

In some examples, the extendable conveyor comprises two or more mechanically extendable sections, which are nested within each other and are disposed in a telescopic manner such that they are adjustably positionable between a retracted position fully or partially nested within the base unit and an extended position fully or partially telescoped forwardly from the base unit. The last mechanically extendable section at the end opposite to the base unit is also referred to as the outmost mechanically extendable section in the following (or briefly "outmost section"). The mechanically extendable sections between the base unit and the outmost mechanically extendable section are also referred to herein as intermediate mechanically extendable sections (or "intermediate section"). In some examples, where the extendable conveyor only comprises one mechanically extendable section, the "intermediate" and the "outmost" mechanically extendable section are the same. In some examples, a so-called droop snoot, which is an extra conveyor section, is located at the outmost section. In some examples, the multi-connector and the multi-connector system, respectively, can also be located at the droop snoot.

For example, the mechanically extendable sections can be moved via a motor drive located in the base unit or any other mechanically extendable section via, for example, drive chains, wire ropes, (timing) belts, and/or the like, interconnecting the sections with each other such that the all mechanically extendable sections can be perform a telescopic movement by driving the motor drive accordingly. The telescopic movement mechanism of an extendable conveyor is generally known to the skilled person.

In some examples, the multi-connector comprises a standardized mechanical connection section which is adapted for mechanically attaching the at least one external component, a fastening section for fastening the multi-connector to the extendable conveyor, and a standardized functional connection section which is adapted for providing at least one of electric power or a vacuum supply for the at least one external component.

In some examples, the standardized mechanical connection section comprises, for example, two or more fastening points at which the external component can be mechanically fixed to the multi-connector. The fastening points are, for example, holes through which a screw connection to the external component can be made, or pins, clamps, and/or any other mechanical fastening structure which is known to the skilled person and which is able to carry the weight of the external component. In some examples, a mixture of, for example, holes and pins, is used.

In some examples, the standardized mechanical connection section has standardized dimensions and/or a standardized shape and/or a standardized distance between fastening points and/or standardized dimensions of the fastening points.

In some examples, the standardized functional connection section has an opening, through hole, and/or any other structure known to the skilled person, through which an electric and/or vacuum supply connection can extend. In some examples, the standardized functional connection section comprises an electric plug/socket and/or a vacuum plug/socket and/or any other structure which is adapted to provide electric power and/or a vacuum supply of an external component. In some examples, the standardized functional connection section of the multi-connector includes a standardized electric connector. Such a standardized electric connector is, for example, a standardized electric socket or plug, which can meet, for example, a respective electric connection standard of a specific country.

In some examples, the extendable conveyor provides the electric power and/or vacuum supply. For example, an electric and/or vacuum connection line extends from the extendable conveyor to the multi-connector and to and/or through the functional connection section to the external component in order to provide electricity and/or a vacuum supply to the external component.

In some examples, the standardized mechanical section is adapted to counteract a gravitational force exerted by the attached at least one external component. The external component has a weight which has to be carried by the multi-connector. As mentioned, the multi-connector can be fastened with the fastening section to the extendable conveyor (e.g., to a support bar and/or any other structure of the extendable conveyor which is sufficient strong to carry the multi-connector and the external components attached to the multi-connector). Thus, in some examples, the mechanical section of the multi-connector directs the gravitational force exerted by the external component via the fastening section to the external conveyor to which the multi-connector is connected to.

In some examples, the standardized mechanical section is adapted to counteract a rotational force exerted by the attached at least one external component. In some examples, the mechanical section has two fastening points which are substantially opposite to each other in order to ensure that the attached external component does not rotate around an axis.

In some examples, the fastening section of the multi-connector comprises two lugs which are substantially opposite to each other. In such examples, the lugs are adapted for fastening the multi-connector to the extendable conveyor (e.g., via a side part which in turn is mounted to a support bar of the extendable conveyor). In some examples, there is an opening between the two lugs through which an electric and/or vacuum supply can extend. In some examples, the opening can be in communication with the functional connection section.

In some examples, the multi-connector is adapted for connecting the at least one external component comprising at least one of a light, a fan, or a vacuum lifting system, as will be explained in more detail below.

Some examples pertain to a multi-connector system for connecting an external component to an extendable conveyor, such as discussed above. The multi-connector system, in some examples, comprises at least one multi-connector as discussed above and at least one external component, as discussed above. The external component, in such examples, comprises a component holder for holding a component, such as a light, a fan, a lifting system or the like, and at least one component connector being adapted to be connected to the at least one multi-connector. In some such examples, the component holder includes the at least one component connector.

In some examples, the component holder is a support bar or similar component, which is connected on one side to the component connector and on the opposite side to the respective component. The component connector can also be an integral part of the component holder, while in other examples, the component connector and the component holder can be separate parts which can be attached to each other (e.g., via screw joint, welding or the like).

In some examples, the at least one component connector can include a standardized mechanical connection section which is adapted for being connected to the standardized mechanical connection section of the multi-connector. The at least one component connector, in some examples, can also include a standardized functional connection section which is adapted for being connected to the standardized functional connection section of the multi-connector.

In some examples, the at least one component connector has at least one protrusion, such as a pin, engaging into the standardized mechanical connection section of the multi-connector, thereby counteracting a rotational force exerted by the component connection. For each protrusion, the standardized mechanical connection section of the multi-connector has, for example, a corresponding hole or blind hole into which the protrusion (e.g., pin) can be engaged.

In some examples, the at least one component connector is mechanically fixed to the multi-connector by a screw joint. Also, in some examples, a mixture of screw joint and the protrusion examples described above may be used.

As mentioned above, the external component in some examples comprises at least one of a light, a fan, or a vacuum lifting system.

By providing a light the surrounding working area of the extendable conveyor is illuminated, since, for example, light rays originating from the light are reflected by the ground, side walls or ceiling in the area of the lighting. In some examples, where the light is connected to a multi-connector at the outmost end of the extendable conveyor, the light can also illuminate, for example, a truck container into which the outmost end of the conveyor extends. Thus, personnel loading or unloading articles on or from the conveying surfaces can feel comfortable because they are working in a well lit loading and/or unloading zone. Also, in such examples, personnel can better read labels on articles to be loaded and/or unloaded. Moreover, the risk of personnel getting injured is decreased because personnel can more easily see obstacles, sharp edges, etc., due to the sufficient illumination of the working area in which they are working.

In some examples, the light comprises a light-emitting diode lamp. Light-emitting diode (LED) lamps are efficient and provide high luminescence and, thus, power consumption of the lighting is relatively low in comparison with conventional lamps, such as fluorescent lamps.

The light in some examples can also include a light reflector which is configured such that light rays originating from the light are emitted upwardly and/or downwardly, but not in a forward/backward direction (or other direction towards personnel) such that personnel are not blinded.

In some examples, the light comprises a lens cover or protection glass. In some such examples, the protection glass is made of a material that can protect a lighting lamp behind the cover to protect the lighting lamp from being crushed or otherwise damaged due to mechanical impacts on the light. Moreover, in some examples, the lens cover is shaped to disperse or diffuse light rays originating from the lamp covered by the lens cover when the light rays go through the lens cover. In some examples, the lens cover diffuses light rays going through it in order to equally distribute the light rays in the area to be illuminated. In some examples, the lens cover also comprises a light filter to, for example, influence the color temperature of the light rays.

In some examples, the light can pivot around a horizontal and/or vertical axis, such that personnel can adjust the direction of light rays originating from the light.

In some examples, the fan is a cross flow fan. In some examples, such a fan has a suction inlet (e.g., on a top or on a bottom) and blows out air laterally to the suction direction. In such examples, the fan can be positioned, for example, at the component holder, such that air is blown in a direction towards personnel working next to the fan.

In some examples, the fan comprises a heater and/or cooler for heating/cooling air which is directed towards personnel next to the fan.

Some examples pertain to an extendable conveyor for conveying articles, as discussed above, wherein one of the at least one mechanically extendable section is an outmost mechanically extendable section. The conveyor, in some such examples, comprises at least one multi-connector or at least one multi-connector system as described above.

In some examples, as also mentioned above, the at least one multi-connector is mounted at the outmost mechanically extendable section. For example, the multi-connector is fixed to a support bar of the outmost mechanically extendable section.

The outmost mechanically extendable section, in some examples, comprises at least one side part which is configured to receive the multi-connector. The side part is mounted in some examples on the left and right side at the end portion of the outmost section. In some examples, the side part can include an opening which is adapted in its shape and size to receive the multi-connector. In some examples, the multi-connector is securely fixed to the side part.

In some examples, by providing the multi-connector at a front end region of the outmost section of the extendable conveyer, the working area where personnel are typically loading and/or unloading articles, can be made more comfortable by connecting useful external components to the multi-connector. Furthermore, in such examples, personnel can select a particular external component for connection that they desire based on the particular circumstances and/or conditions of the work environment.

In some examples, the standardized functional connection section of the multi-connector is connected to an electric supply and/or a vacuum supply of the extendable conveyor, as also discussed above.

Returning to FIG. 1, there is illustrated the example multi-connector 4 mounted to the extendable conveyor 1 in accordance with the teachings disclosed herein. The extendable conveyor 1 has a base unit 43 (see FIG. 11), multiple intermediate mechanically extendable sections and an outmost section 15, which are mechanically extendable and which are nested within each other, as also explained above. In the illustrated examples the extendable conveyor 1 is shown in an extended position (except for FIG. 11 where the example extendable conveyor 1 is shown in a fully nested position). The mechanically extendable sections are cantileverly supported by the next inwardly or rearwardly positioned extendable section and the base unit 43 and are nested within one another, such that the sections can be retracted into the base unit 43 to a stored position which minimizes interference with the floor space of a loading dock when the conveyor is not in use.

In the illustrated examples, a conveying surface in the form of a belt 2 extends over all of the mechanically extendable sections. The belt 2, in some examples, is driven by a belt drive located in the base unit 43, as generally known to the skilled person.

In some examples, the multi-connector 4 has a standardized mechanical section which has four threaded holes 7 and nine pin holes 44 which are distributed in a substantially circular manner around a functional or powered connection section 6 which is formed as an opening in a middle area of the multi-connector 4.

The four threaded holes 7, in some examples, are positioned to form a square. In such examples, the corners of the square (defined by the threaded holes 7) are in the same circle as the nine pin holes 44.

The threaded holes 7, in some examples, are used as a screw joint for fastening a component connector, as explained in more detail below.

In the nine pin holes 44, in some examples, respective component connector pins can be inserted in order to prevent a pivot moment of a corresponding component connector with respect to the multi-connector 4.

The multi-connector 4, in some examples, has a generally cylindrical shape with the longitudinal axis extending transversally to the longitudinal extension direction of the outmost section 15 of the extendable conveyor 1.

The functional or powered connection section 6, in some examples, can be adapted to provide an electric and/or a vacuum supply as explained above. In some such examples, an electric and/or vacuum supply line can be placed within the extendable conveyor 1 through the functional connection 6, in order to supply a component connected to the multi-connector 4 with electric current and/or a vacuum (under pressure).

In some examples, the threaded holes 7 and the pin holes 44 have standardized dimensions and are distributed in a standardized pattern on the front face of the multi-connector 4. Thus, the threaded holes 7 and the pin holes 44, in some examples, are placed at predefined distances and at predefined locations on the front face of the multi-connector 4, thereby providing a standardized mechanical connection section.

The multi-connector 4, in some examples, is made of metal. In other examples, the multi-connector 4 is made of plastic or another stiff material having mechanical properties which are useful for connecting external components, as discussed above and described in more detail below.

Figure 2:
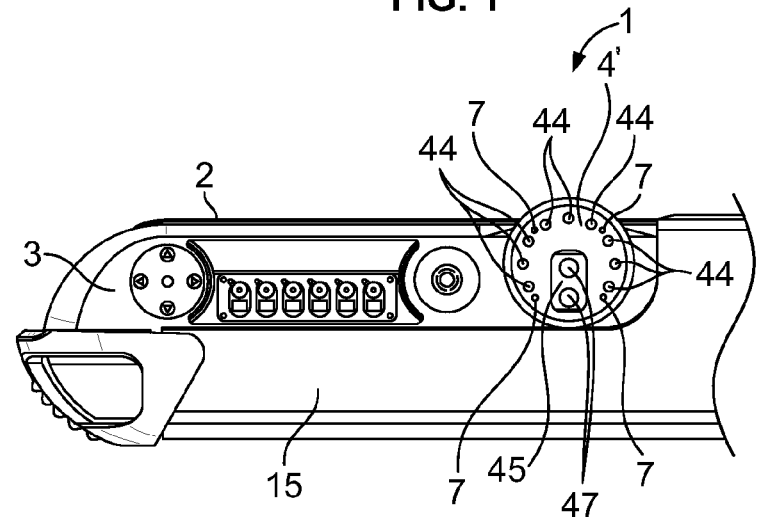
FIG. 2 illustrates another example multi-connector at an outmost mechanically extendable section of an extendable conveyor constructed in accordance with the teachings disclosed herein, the multi-connector having an electric socket in its middle area.

FIG. 2 illustrates another example multi-connector 4', where a standardized electric socket 45, having two electric contact holes 47, is placed within the functional/powered connection section 6. The electric socket 45, in some examples, is coupled to corresponding electric lines within the extendable conveyor 1. In some examples, a component connector for connecting a component, such as already explained above, can have a corresponding plug with two pins engaging into the two contact holes 47, when connecting the component connector to the multi-connector 4'.

Figure 3:
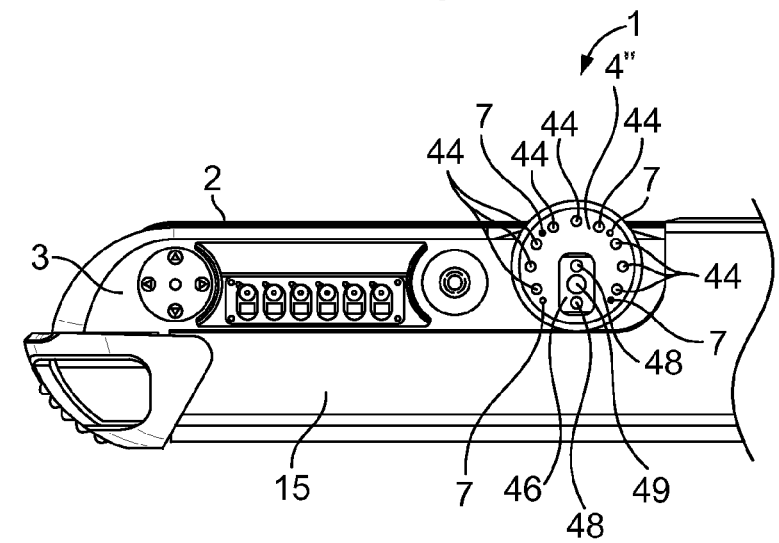
FIG. 3 illustrates another example multi-connector at an outmost section of an extendable conveyor in accordance with the teachings disclosed herein, the multi-connector having an electric power and vacuum supply socket in its middle area.

FIG. 3 illustrates another example multi-connector 4'', where a standardized electric and vacuum supply socket 46, having two electric contact holes 48 and a vacuum connection opening 49, is placed within the functional/powered connection section 6 of the multi-connector 4''. In some examples, the electric socket 46 (i.e. the two electric contact holes 48) is coupled to corresponding electric lines within the extendable conveyor 1. The vacuum connection opening 49, in some examples, is connected to a vacuum supply line within the extendable conveyor 1. In some examples, a component connector for connecting a component, such as already explained above, can have a corresponding plug with two pins engaging into the contact holes 48 and a vacuum connector connecting to the vacuum connection opening 49, when connecting the component connector to the multi-connector 4''.

In the illustrated examples, the multi-connectors 4', 4'' each have the same threaded holes 7 and pin holes 44 as the multi-connector 4 explained above, such that the explanations made for multi-connector 4 of FIG. 1 also apply to the multi-connectors 4', 4''.

In some examples, the multi-connectors 4, 4', 4'' are each located within a side part 3 of the outmost section 15. The side part 3, in some examples, also comprises control buttons, etc., for controlling the extendable conveyor 1 and/or components which are connected to the multi-connector 4, 4', 4''. In such examples, the external casing of the side part 3 has a receptacle that has a complimentary shape to the multi-connector (e.g., the cylindrical multi-connectors 4, 4', 4'' are received within cylindrical housings of the side part 3).

On each side of the outmost section 15, in some examples, one side part 3, with a corresponding multi-connector 4, 4', 4'', is located such that components can be connected to the left and/or the right side of the outmost section 15 of the extendable conveyor 1.

Figure 5:
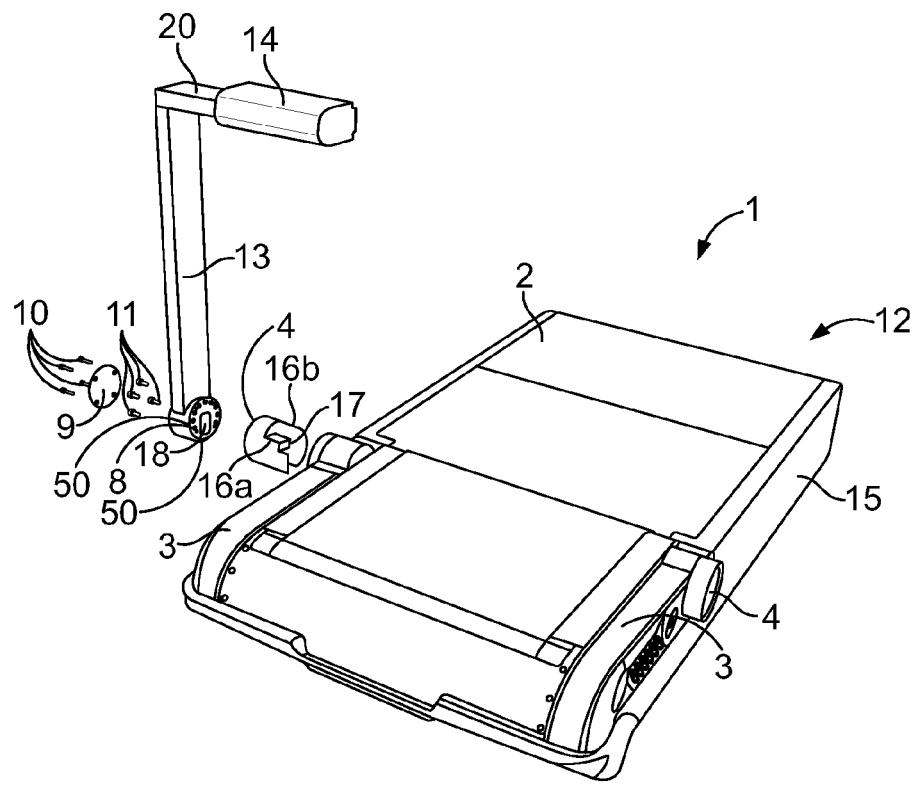
FIG. 5 illustrates the example multi-connector with the example light of FIG. 4 in a different view.

In some examples, as shown in FIG. 5, the multi-connectors 4, 4', 4'' have two connection lugs 16a and 16b which are substantially opposite to each other and which are opposite to the front face where the threaded holes 7 and pin holes 44 are located. The lugs 16a and 16b, in some examples, each have the shape of a generally half cylinder. In some examples, an opening 17 between the lugs 16a and 16b allows the placement of an electric and or vacuum line through the powered connection section 6 or the placement of an electric socket 45 or electric and vacuum supply socket 46, as explained above. Thus, the opening 17 between the opposite lugs 16a and 16b provides a space for the line connection of an electric and/or vacuum line from within the extendable conveyor.

The multi-connectors 4, 4', 4'', in some examples, are welded with the outer surface of each lug 16a and 16b to an inner surface of an opening 5 (FIG. 4) of each side part 3. In this manner, a mechanically resilient connection between the multi-connector 4, 4', 4'' and the side part 3 is provided. In other examples, the multi-connector 4, 4', 4'' is welded or otherwise mounted to a support bar within the extendable conveyor 1.

Figure 10:
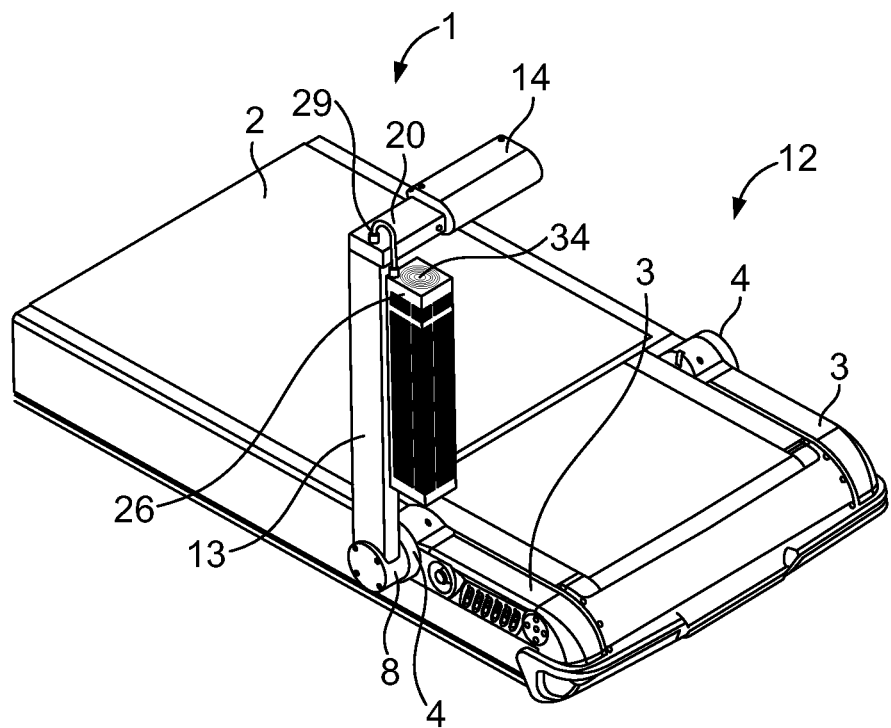
FIG. 10 illustrates the example light of FIGS. 4 to 6 and the example fan of FIGS. 7 to 9 both connected via a common component holder to the example multi-connector of FIG. 1.
Figure 11:
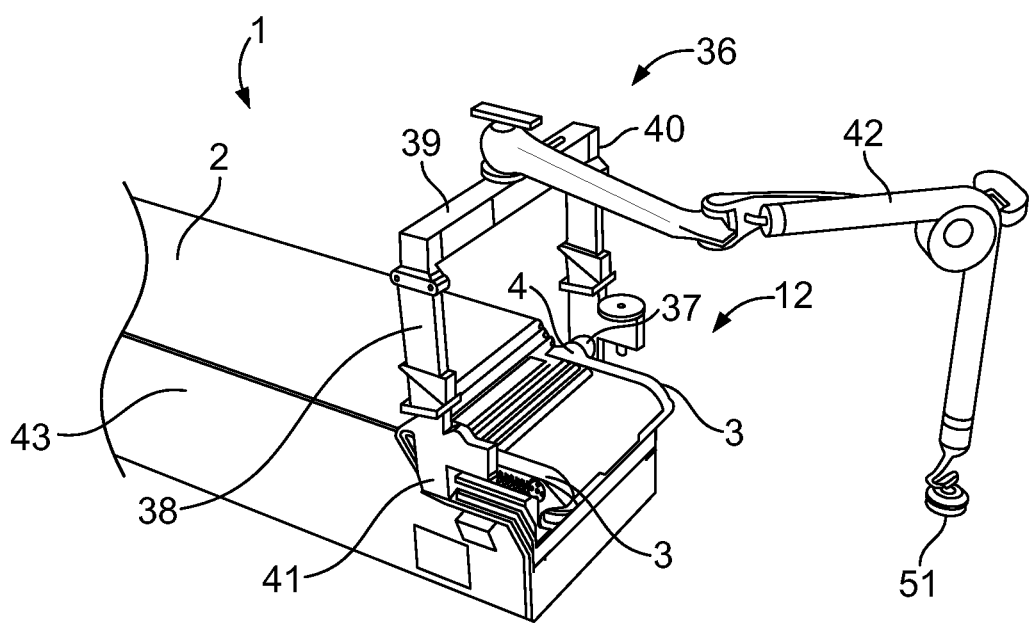
FIG. 11 illustrates an example vacuum lifting system connected to the example multi-connector of FIG. 1.

In the following, examples are described where different external components are connected to the multi-connector 4, 4', 4''. For example, an example light 14 is shown in FIGS. 4 to 6, an example fan 26 is shown in FIGS. 7 to 9, an example combination of the light 14 and the fan 26 is shown in FIG. 10, and an example vacuum lifting system 36 is shown in FIG. 11.

Figure 4:
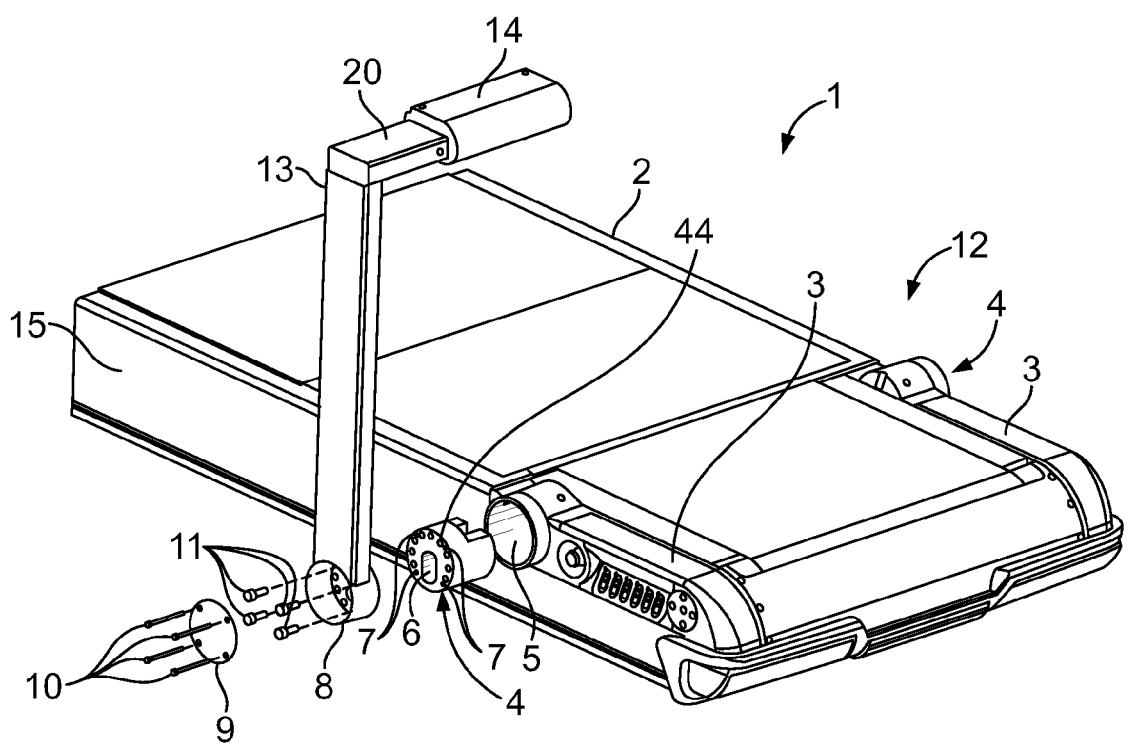
FIG. 4 illustrates the example multi-connector of FIG. 1 for connecting a light to an outmost mechanically extendable section of an extendable conveyor in accordance with the teachings disclosed herein.
Figure 6:
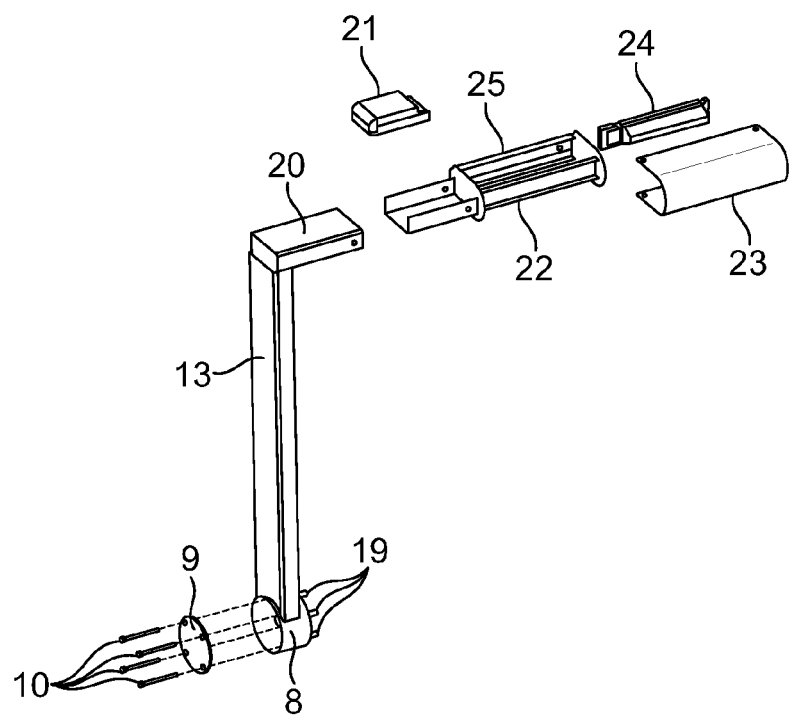
FIG. 6 is an exploded view of the example light shown in FIGS. 4 and 5, illustrating an example component connector to be connected to the example multi-connector of FIG. 1.
Figure 7:
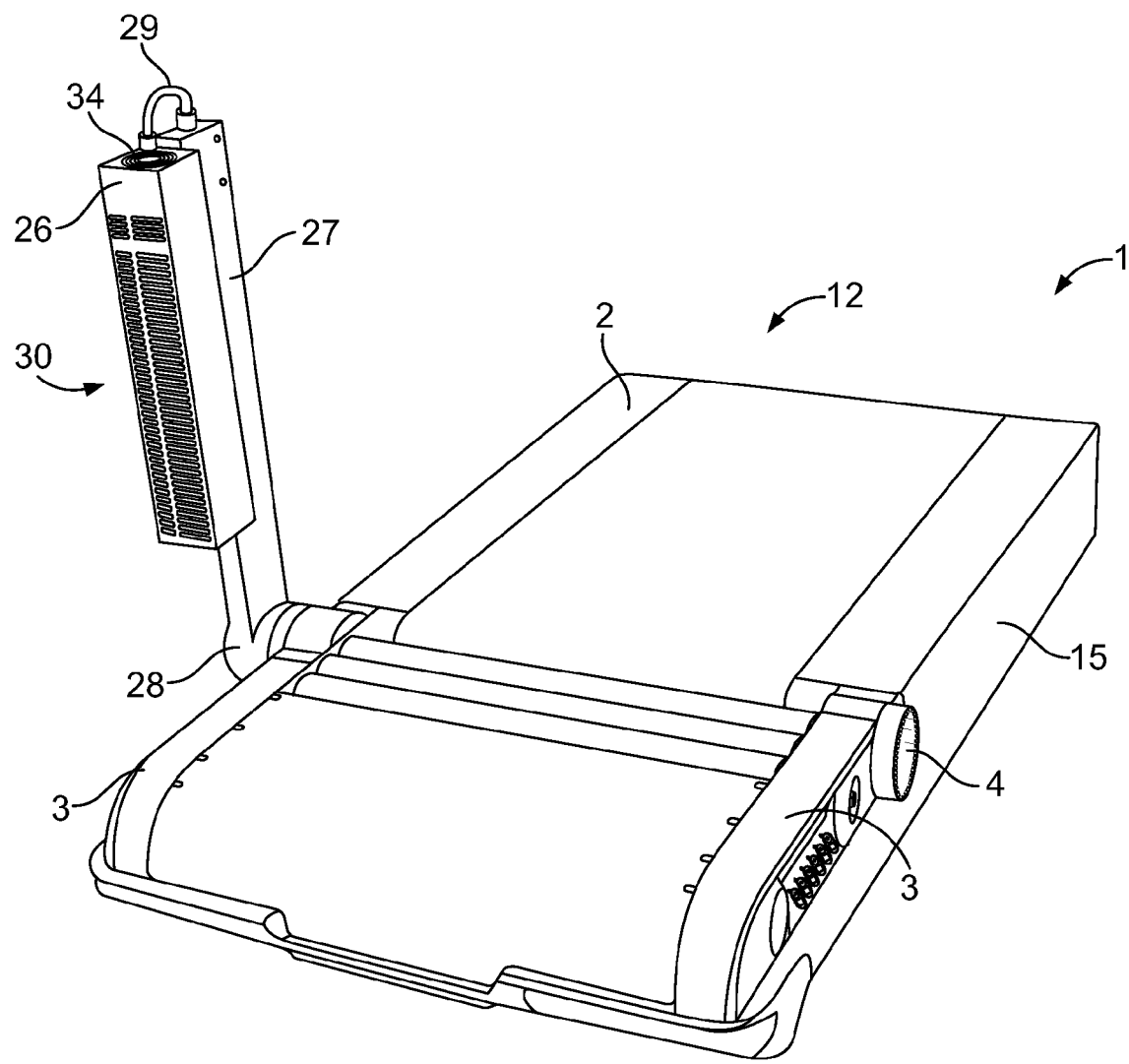
FIG. 7 illustrates an example fan connected to the multi-connector shown in FIG. 1.

As shown in the illustrated examples of FIGS. 4 to 6, an external component, such as the light 14, can be connected via a component connector 8 to one of the multi-connectors 4, 4', 4'' as illustrated in FIG. 1

The light 14, in some examples, is mounted to an L-shaped component holder 13. The component connector 8, in some examples, is placed on the lower and free end of the long part of the L-shaped component holder 13. The component connector 8, in some examples, has five pins 19 to engage the pin holes 44 of the multi-connectors 4, 4', 4'', when being connected to one of the multi-connectors 4, 4', 4''. The component connector 8, in some examples, is fastened by four screws 11 which extend through four respective holes 50 in the component connector 8 and which are screwed into the threaded holes 7 of the multi-connectors 4, 4', 4'', thereby providing a closure force between component connector 8 and multi-connectors 4, 4', 4''.

The component connector 8, in some examples, is flange-like and has a generally cylindrical shape which is adapted to the shape of the multi-connectors 4, 4', 4''. Moreover, in some examples, the dimensions and placement of the pins 19 are adapted to align with the pin holes 44 of the multi-connectors 4, 4', 4''. Similarly, in some examples, the holes 50 through which the screws 11 are guided and screwed into the threaded holes 7 of the multi-connectors 4, 4', 4'' are adapted in their dimensions and placement to align with the threaded holes 7 of the multi-connectors 4, 4', 4''.

In some examples, as a result of the pins 19 of the component connector 8 inserted into the pin holes 44 of the multi-connectors 4, 4', 4'', a rotation of the component connector 8 with respect to the corresponding multi-connector 4, 4', 4'' is prevented. By screwing the screws 11 through the holes 50 of the component connector 8 into the multi-connector 4, 4', 4'', in some examples, a closure force between the component connector 8 and the corresponding multi-connector 4, 4', 4'' is provided.

In some examples, to protect the screws 11 and to close the inner space of the component connector 8, a cover 9 is mounted with four screws 10 to the component connector 8.

In some examples, at the free end of the short part 20 of the L-shaped component holder 13 the light 14 is attached. In some examples, the light 14, as detailed in the exploded view of FIG. 6, includes a reflector 25 (e.g., made of aluminum), a LED lamp module 24 (e.g., a Philips Fortimo LLM with a power consumption of 12 W and 1100 lumen), a LED driver 21, a LED protection glass 23, and a blinding protector 22.

The LED lamp 24, in some examples, is housed within the reflector 25 and the blinding protector 22 and is protected by the protection glass 23. The blinding protector 22, in some examples, reduces (e.g., prevents) light rays emanating from the LED lamp 24 from travelling directly in a substantially forward direction, such that personnel working in front of light 14 are not temporarily blinded by the light. Similarly, reflector 25 prevents that light rays originating from the LED lamp 24 travelling directly in a substantially backward direction. The LED protection glass 23, in some examples, diffuses light rays from the LED lamp 24 in order to substantially equally illuminate the area around the light 14, and in particular above and below the light 14. Thus, the light rays from the LED lamp 24, in some examples, basically travel in generally upward and downward directions such that personnel loading and/or unloading articles have a well illuminated work area and can, for example, easily read labels on articles due to the good illumination.

In some examples, the LED driver 21 drives the LED lamp 24. In some examples, the light 14 can be switched on/off with a switch located at the side part 3.

In some examples, the light 14 is connected to one of the multi-connectors 4, 4', 4" on the right side (e.g., the left side in FIG. 5) of the outmost section 15 at a front end region 12 of the outmost section 15. Additionally or alternatively, in other examples, the light 14 is connected to one of the multi-connectors 4, 4', 4" on the left side of the outmost section 15.

In some examples, the electrical connection between the light 14 and the multi-connector 4, 4', 4" is provided by an electric line through the powered connection section 6 of the multi-connectors 4, 4', 4" and through a connection hole 18 in the middle area of component connector 8. The electric line, in such examples, runs within the component holder 13 and is connected to the LED driver 21.

In another example, a fan 26 is connected to one of the multi-connectors 4, 4', 4", as illustrated in FIGS. 7 to 9. In some examples, the fan 26 is a block-shaped cross flow fan which has an intake 34 on the upper side and an outlet 30 on a front side. The fan 26, in some examples, is hinged to a component holder 27 with two hinges 35a and 35b such that fan 26 can pivot around a vertical axis which is parallel to the longitudinal axis of the component holder 27.

The component holder 27, in some examples, has a longitudinal shape and a component connector 28 located on a lower end of the component holder 27, which is the same or identical to the component connector 8 for the light 14 explained above.

The component connector 28, in some examples, has five pins 32 for engaging respective pin holes 44 of the multi-connectors 4, 4', 4" and four through holes 33 through which screws are put and screwed into the threaded holes 7 of the multi-connectors 4, 4', 4" for providing a closure force between component connector 28 and the corresponding multi-connector 4, 4', 4", as discussed above for the light 14.

The electric supply for the fan 26, in some examples, is guided through an opening 31 in a middle area of the component connector 28 which is provided by an electric line through the functional or powered connection section 6 of the multi-connectors 4, 4', 4". In such examples, the electric line runs through the component holder 27 and runs as cable 29 from an upper end of component holder 27 to the upper face of the fan 26.

In some examples, the fan 26 can be pivoted from an operating position, as illustrated in FIG. 9, into a storing position, as illustrated in FIG. 8. In the operating position of such examples, the fan 26 is in front of the component holder 27 such that air blown out through outlet 30 is directed to a personnel working next to the front end region 12 of the outmost section 15. In the storing position of such examples, the fan 26 is hidden behind the component holder 27 such that personnel loading and/or unloading articles in the front end region 12 of the outmost section are not hindered by the fan 26 during while working.

In some examples, a mesh in the outlet 30 of the fan 26 blocks the fingers, clothing, etc., of personnel from getting into the fan 26 thereby reducing (e.g., preventing) accidents. Moreover, the mesh in the outlet 30, in some examples, has a pattern which helps to equally distribute the air blown out by the fan 26. As discussed above, in some examples, a heater and/or a cooler is provided in connection with the fan 26 such that air blown out by the fan 26 can be heated and/or cooled. Also the fan 26, in some examples, can be controlled by a respective control switch located in the side part 3.

In some examples, as illustrated in FIG. 10, a light 14 and a fan 26 can be located on the same component holder 13. The light 14 and the fan 26, in such examples, correspond to the light 14 and the fan 26 as discussed above. Moreover, in such examples, the component holder 13 corresponds to the component holder 13 associated with the light 14 discussed above. In such examples, the fan 26 is hinged to the component holder 13, as explained above. Moreover, in such examples, the electric connection cable 29 for electric supply of the fan 26 is guided from an upper side of the longitudinal part of the component holder 13 and the part 20 to the fan 26.

In some examples, the component holder 13 has the component connector 8, which has already been explained in detail above. Both the light 14 and the fan 26, in such examples, are electrically supplied via the multi-connector 4, 4', 4" as explained above.

Also, in some examples, other components, such as a vacuum lifting system 36 can be connected to any of the multi-connectors 4, 4', 4". The vacuum lifting system 36, in some examples, has a support structure which has a right vertical support arm 38 and a left vertical support arm 40 which are connected via a crossbar 39. In some examples, in a middle region of the crossbar 39 a lifting arm 42 is pivotally mounted which has a pickup tube 51 at its lower end. In such examples, at the end of the pickup tube 51 articles can be picked up via the vacuum supplied to the end of the pickup tube 51.

Each one of the left and right vertical support arms 38, 40 has a component connector 37 on its lower end at which each one of the left and right vertical support arms 38, 40 are connected to one multi-connector 4, 4', 4" residing within the corresponding left and right side parts 3 at the outmost section 15 of extendable conveyor 1.

The component connector 37, in some examples, corresponds to the component connectors 8, 28 explained above for the light 14 and the fan 26 and is covered by a cover 41. In contrast to the component connectors 8, 28, in the illustrated example of FIG. 11, a vacuum supply is placed through the corresponding multi-connector 4, 4', 4" and through the component connector 8 in order to supply the pickup tube 51 with a vacuum.

In addition to what has been disclosed herein, other external components can be connected to the multi-connectors 4, 4', 4", such as a heater or cooler, electric tools, speakers, etc.

The examples explained above can also be combined with each other as will be apparent to the skilled person.

In some examples, a multi-connector is disclosed for connecting at least one external component to an extendable conveyor for conveying articles. In some examples, the multi-connector comprises a base unit, at least one mechanically extendable section supported in a cantilevered manner and selectively positionable relative to the base unit, and a conveying surface for conveying articles extending at least partially on an upper side of the at least one mechanically extendable section. In some examples, the multi-connector comprises a standardized mechanical connection section adapted for mechanically attaching the at least one external component, a fastening section for fastening the multi-connector to the extendable conveyor, and a standardized functional connection section adapted for providing at least one of an electric or a vacuum supply for the at least one external component.

In some examples, a multi-connector system is disclosed for connecting an external component to an extendable conveyor for conveying articles. In some examples, the multi-connector system comprises a base unit, at least one mechanically extendable section supported in a cantilevered manner and selectively positionable relative to the base unit, and a conveying surface for conveying articles extending at least partially on an upper side of the at least one mechanically extendable section. In some examples, the multi-connector system comprises at least one multi-connector and at least one external component. The external component comprises a component holder for holding a component, and at least one component connector adapted to be connected to the at least one multi-connector. The component holder is to include the at least one component connector.

In some examples, an extendable conveyor for conveying articles is disclosed that comprises a base unit, at least one mechanically extendable section supported in a cantilevered manner and selectively positionable relative to the base unit, and a conveying surface for conveying articles extending at least partially on an upper side of the at least one mechanically extendable section. In some such examples, one of the at least one mechanically extendable section is an outmost mechanically extendable section comprising a multi-connector.

In some examples, an extendable conveyor for conveying articles is disclosed that comprises a base unit, at least one mechanically extendable section supported in a cantilevered manner and selectively positionable relative to the base unit, and a conveying surface for conveying articles extending at least partially on an upper side of the at least one mechanically extendable section. In some such examples, a first one of the at least one mechanically extendable sections is an outmost mechanically extendable section comprising at least one multi-connector system.

It is noted that this patent claims priority from European Patent Application Serial Number 12 001 399.0, which was filed on Mar. 1, 2012, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A multi-connector to connect an external component to an extendable conveyor, the multi-connector comprising:
    a mechanical connection section to mechanically attach the external component to the extendable conveyor;
    a fastening section to fasten the multi-connector to the extendable conveyor; and
    a powered connection section to provide electric power and a vacuum supply to the external component.

2. The multi-connector of claim 1, wherein the mechanical connection section is to counteract at least one of a gravitational force exerted by the external component or a rotational force exerted by the external component.

3. The multi-connector of claim 1, wherein the fastening section comprises two lugs located substantially opposite to each other, the lugs to fasten the multi-connector to the extendable conveyor.

4. The multi-connector of claim 1, wherein the external component comprises at least one of a light, a fan or a vacuum lifting system.

5. The multi-connector of claim 1, wherein the powered connection section includes an electric connector.

6. The extendable conveyor of claim 1, wherein the multi-connector comprises a housing having a longitudinal axis disposed non-parallel relative to a longitudinal axis of the extendable conveyor, the housing being coupled to a side of an outer most section of the extendible conveyor.

7. A universal multi-connector system for use with an extendable conveyer comprising:
    a multi-connector to couple to a side of an outermost extendable conveyor section of the extendable conveyor, the multi-connector including a powered connection section to provide at least one of electric power or a vacuum supply; and
    a first external component, the first external component comprising:
        a first component holder to hold a first component including at least one of a light, a fan, or a vacuum lifting system, and
        a first component connector to be fastened to the multi-connector, the multi-connector to connect the first external component to the extendable conveyor.

8. The multi-connector system of claim 7, wherein the first component connector includes at least one of pins to engage holes of the multi-connector or a powered connection hole to be connected to a powered connection section of the multi-connector.

9. The multi-connector system of claim 7, wherein the first component connector has a protrusion engaging into the multi-connector to resist rotation of the first component connector.

10. The multi-connector system of claim 7, wherein the first component connector is mechanically fixed to the multi-connector by a screw joint.

11. The multi-connector system of claim 7, wherein the light comprises a light-emitting diode lamp.

12. The multi-connector system of claim 7, wherein the light includes a light reflector to direct light rays originating from the light at least one of generally upwards or generally downwards.

13. The multi-connector system of claim 7, wherein the fan is a cross flow fan.

14. The multi-connector system of claim 7, wherein the fan comprises at least one of a heater or a cooler to, respectively, heat or cool air.

15. The multi-connector system of claim 7, further comprising a second external component interchangeable with the first external component, the second external component comprising:
- a second component holder to hold a second component including another one of at least a light, a fan, or a vacuum lifting system; and
- a second component connector to be fastened to the multi-connector, the multi-connector to connect the second external component to the extendable conveyor.

16. An extendable conveyor to convey articles, the conveyor comprising:
- a base unit;
- a mechanically extendable section supported in a cantilevered manner and selectively positionable relative to the base unit;
- a conveying surface to convey articles, the conveying surface to extend on an upper side of the mechanically extendable section, the mechanically extendable section is an outmost extendable section having an aperture; and
- a multi-connector coupled to the outmost extendable section, the multi-connector defining a housing to be received within the aperture of the outmost extendable section, the housing having a longitudinal axis that is perpendicular to a longitudinal axis of the outmost extendable section.

17. The extendable conveyor of claim 16, wherein the outmost mechanically extendable section comprises a side part to receive the multi-connector.

18. The extendable conveyor of claim 16, wherein the multi-connector is fixed to a support bar of the outmost extendable section.

19. The extendable conveyor of claim 16, wherein the multi-connector comprises a powered connection section to be connected to at least one of an electric supply or a vacuum supply of the extendable conveyor.

20. The extendable conveyor of claim 16, wherein the multi-connector secures an external component to the extendable conveyor.

* * * * *

UNITED STATES PATENT AND TRADEMARK OFFICE
CERTIFICATE OF CORRECTION

Page 1 of 1

PATENT NO. : 9,151,311 B2
APPLICATION NO. : 13/782744
DATED : October 6, 2015
INVENTOR(S) : Baek et al.

It is certified that error appears in the above-identified patent and that said Letters Patent is hereby corrected as shown below:

IN THE CLAIMS

Column 14, line 8 (Claim 17): delete "mechanically" between "outmost" and "extendable"

Signed and Sealed this
Eighth Day of March, 2016

Michelle K. Lee
*Director of the United States Patent and Trademark Office*